US010953758B2

(12) United States Patent
Hirsch et al.

(10) Patent No.: US 10,953,758 B2
(45) Date of Patent: Mar. 23, 2021

(54) RECHARGEABLE BATTERY ARRANGEMENT FOR AN ELECTRIC OR HYBRID VEHICLE

(71) Applicant: Mahle International GmbH, Stuttgart (DE)

(72) Inventors: Stefan Hirsch, Stuttgart (DE); Christan Kern, Remseck (DE); Andre Loges, Leonberg (DE); Michael Moser, Ellwangen (DE); Mario Wallisch, Aichtal (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/632,334

(22) PCT Filed: Jul. 12, 2018

(86) PCT No.: PCT/EP2018/069002
§ 371 (c)(1),
(2) Date: Jan. 17, 2020

(87) PCT Pub. No.: WO2019/016077
PCT Pub. Date: Jan. 24, 2019

(65) Prior Publication Data
US 2020/0164753 A1  May 28, 2020

(30) Foreign Application Priority Data

Jul. 18, 2017 (DE) .......................... 202017105488.8
Sep. 18, 2017 (DE) .......................... 102017216475.1

(51) Int. Cl.
*B60L 50/00* (2019.01)
*B60L 50/64* (2019.01)
(Continued)

(52) U.S. Cl.
CPC ............... *B60L 50/64* (2019.02); *B60L 50/66* (2019.02); *H01M 2/0285* (2013.01); *H01M 2/1083* (2013.01); *H01M 2/206* (2013.01)

(58) Field of Classification Search
CPC ................................. B60L 50/64; B60L 50/66
See application file for complete search history.

(56) References Cited

U.S. PATENT DOCUMENTS 6,111,387 A * 8/2000 Kouzu ................ H01M 10/643
320/107
6,541,154 B2 * 4/2003 Oogami .............. H01M 10/425
429/159

(Continued)

FOREIGN PATENT DOCUMENTS

CN 104981888 A 10/2015
CN 205985210 U 2/2017

(Continued)

OTHER PUBLICATIONS

English abstract for JP-H-0722459.
(Continued)

*Primary Examiner* — Hau V Phan
(74) *Attorney, Agent, or Firm* — Fishman Stewart PLLC

(57) ABSTRACT

A rechargeable battery arrangement for an electric or hybrid vehicle may include a plurality of battery modules and a module connector arrangement electrically contact-connecting adjacent battery modules when in a switching position and electrically separating the adjacent battery modules when in a basic position. The module connector arrangement may include a plurality of module connectors each secured to a respective battery module and including a positive pole contact element and a negative pole contact element. Each respective module connector may be secured to a respective battery module and may include a guide device. The guide device may include an actuating. At least one of a positive (Continued)

pole contact element and a negative pole contact element of a battery module is electrically interconnectable to at least one of the positive pole contact element and the negative pole contact element of an adjacent battery module when the actuating element is actuated.

20 Claims, 5 Drawing Sheets

(51) Int. Cl.
*B60L 50/60* (2019.01)
*H01M 2/02* (2006.01)
*H01M 2/10* (2006.01)
*H01M 2/20* (2006.01)

(56) References Cited

U.S. PATENT DOCUMENTS

| | | | | |
|---|---|---|---|---|
| 7,871,723 | B2* | 1/2011 | Ikeda | H01M 2/24 429/159 |
| 8,322,476 | B2* | 12/2012 | Komaki | H01M 2/206 180/68.5 |
| 8,353,374 | B2* | 1/2013 | Sugawara | B60L 58/27 180/65.1 |
| 8,598,884 | B2* | 12/2013 | Yano | H01M 10/486 324/427 |
| 8,603,663 | B2* | 12/2013 | Park | H01M 2/206 429/152 |
| 10,763,482 | B2 | 9/2020 | Kimura et al. | |
| 2002/0102457 | A1* | 8/2002 | Oogami | B60L 58/26 429/159 |
| 2008/0264291 | A1* | 10/2008 | Pike | H01M 2/1077 105/50 |
| 2009/0053586 | A1* | 2/2009 | Fredriksson | H01M 10/482 429/57 |
| 2009/0220852 | A1* | 9/2009 | Fujii | H01M 10/6566 429/72 |
| 2010/0167115 | A1* | 7/2010 | Okada | H01M 2/1077 429/99 |
| 2010/0187027 | A1* | 7/2010 | Komaki | H01M 2/1077 180/65.21 |
| 2010/0271223 | A1* | 10/2010 | Ohkura | H01M 10/482 340/636.13 |
| 2011/0056758 | A1* | 3/2011 | Hoh | H01M 2/1241 180/68.5 |
| 2012/0003507 | A1 | 1/2012 | Krieg | |
| 2012/0019061 | A1* | 1/2012 | Nishihara | H01M 2/206 307/10.1 |
| 2012/0031695 | A1* | 2/2012 | Tsuchiya | B60L 58/21 180/68.5 |
| 2013/0207459 | A1* | 8/2013 | Schroder | H01M 10/613 307/10.1 |
| 2013/0216878 | A1* | 8/2013 | Merriman | H01M 2/206 429/92 |
| 2013/0252032 | A1* | 9/2013 | Zhao | H01M 2/305 429/7 |
| 2015/0232049 | A1* | 8/2015 | Ohsumi | B60K 11/06 180/68.1 |
| 2015/0239719 | A1* | 8/2015 | Oishi | H01M 10/625 180/68.5 |
| 2016/0072108 | A1 | 3/2016 | Keller et al. | |
| 2018/0034035 | A1 | 2/2018 | Hinterberger et al. | |

FOREIGN PATENT DOCUMENTS

| | | |
|---|---|---|
| DE | 102009001514 A1 | 9/2010 |
| DE | 102012222712 A1 | 6/2014 |
| DE | 102014113023 A1 | 3/2016 |
| DE | 102015002147 B3 | 6/2016 |
| DE | 102015220589 A1 | 4/2017 |
| EP | 2843729 A1 | 3/2015 |
| JP | H-0722459 A | 1/1995 |
| WO | 2016/207269 | 12/2016 |

OTHER PUBLICATIONS

English abstract for DE-102015220589.
English abstract for DE-102012222712.
English abstract for CN-205985210.
Chinese Office Action/Search Report for CN201880048348.8 dated Sep. 2, 2020.

* cited by examiner

RECHARGEABLE BATTERY ARRANGEMENT FOR AN ELECTRIC OR HYBRID VEHICLE

CROSS-REFERENCE TO RELATED APPLICATIONS

This application claims priority to International Patent Application No. PCT/EP2018/069002, filed on Jul. 12, 2018, German Patent Application No. DE 20 2017 105 488.8, filed on Jul. 18, 2017, and German Patent Application No. DE 10 2017 216 475.1, filed on Sep. 18, 2017, the contents of each of which are hereby incorporated by reference in their entirety.

TECHNICAL FIELD

The invention relates to a rechargeable battery arrangement for an electric or hybrid vehicle comprising a plurality of battery modules, which are electrically contact-connected to one another.

BACKGROUND

Rechargeable battery arrangements are already known and can be used, for example, in an electric or hybrid vehicle as traction batteries. The traction batteries thereby usually comprise a plurality of battery modules of a plurality of individual cells, which are electrically interconnected to one another, in order to be able to provide a necessary amount of energy to the electric or hybrid vehicle. The individual battery modules are usually secured in a housing and have to be electrically interconnected after the assembly in the electric or hybrid vehicle. Even though the individual battery modules usually generate a voltage of below 60 V, high voltages can already be created in the traction battery in response to the interconnection of the individual battery modules. This is why special protective measures need to be taken.

Different solutions for interconnecting the battery modules in a traction battery are known from the prior art. For example, DE 10 2014 113 023 A1 describes a traction battery comprising a plurality of battery modules, which each have a notch on the negative pole and on the positive pole. A connector rail, which contact-connects the battery modules to one another in an electrically conductive manner, is then arranged in the notch of the respective adjacent battery modules. A traction battery is described in DE 10 2015 002 147 B3, in which the individual battery modules are first connected to one another by means of connector rails, and the individual cells are subsequently interconnected in the respective battery modules. In the case of these solutions, the battery modules have to disadvantageously be interconnected to one another in a complex manner and partially under high voltage. DE 2009 001 514 A1 discloses a traction battery comprising a plurality of battery modules, which are arranged in a housing. The battery modules are thereby electrically interconnected to one another in response to the attachment of a cover to the housing. The publication WO 2016/207269 A1 discloses a further solution for interconnecting the individual battery modules in a traction battery. The contact elements of the battery modules are extended here by means of cables, so that the contact elements of the adjacent battery modules can be secured to one another in a simplified manner. An assembly as well as a disassembly of the traction battery in the electric or hybrid vehicle can only be performed by qualified and trained personnel.

SUMMARY

It is thus the object of the invention to specify an improved or at least alternative embodiment for a rechargeable battery arrangement of the generic type, in the case of which the described disadvantages are overcome.

This object is solved according to the invention by means of the subject matter of the independent claim(s). Advantageous embodiments are subject matter of the dependent claim(s).

The present invention is based on the general idea of simplifying an interconnecting in a rechargeable battery arrangement. The rechargeable battery arrangement is thereby suitable for an electric or hybrid vehicle and has a plurality of battery modules, which are electrically contact-connected to one another. Each of the battery modules has a plurality of individual cells—for example pouch cells—which are electrically interconnected to one another. The rechargeable battery arrangement further has a module connector arrangement, which electrically contact-connects the adjacent battery modules in a switching position, and electrically separates them in a basic position. A module connector of the module connector arrangement is thereby in each case secured by means of a substance-to-substance bond to a respective one of the battery modules with a positive pole contact element and with a negative pole contact element.

The basic position of the module connector arrangement thereby corresponds to the basic position of the individual module connectors, and the switching position of the module connector arrangement corresponds to the switching position of the individual module connectors. The respective module connector is furthermore already electrically contact-connected to the individual cells of the corresponding battery module and in each case has the positive pole contact element and the negative pole contact element. The adjacent battery modules can thus be electrically interconnected to one another with reduced effort by means of a contact-connecting of the negative pole contact elements to the positive pole contact elements. According to the invention, the respective negative pole contact element and the respective positive pole contact element of the adjacent battery modules are arranged so as to abut on one another in the switching position and can thus be electrically contact-connected to one another. Conventional connector rails or cables or current bridges are in particular no longer necessary and an interconnecting of the battery modules in the rechargeable battery arrangement is significantly simplified.

In the case of an advantageous further development of the rechargeable battery arrangement according to the invention, it is provided that the respective positive pole contact element has a positive pole contour and the respective negative pole contact element has a negative pole contour, which is embodied in a complementary manner, which are secured to one another in a positive or negative manner in the switching position of the module connector. The positive pole contact element can in particular be a plug with the positive pole contour, and the negative pole contact element can be a socket, which is embodied complementary to the plug, with the negative pole contour. The socket and the plug, which is embodied in a complementary manner, can be secured to one another in a non-positive manner—for example by means of clamping—or also in a positive manner. The positive pole contact element and the negative pole contact element are advantageously electrically insulated to the outside at least in some areas, in order to provide a safe interconnecting of the battery modules in the rechargeable battery arrangement. An alternative embodiment is also conceivable, in the case of which the positive pole contact element is a socket with the positive pole contour, and the negative pole contact element is a plug, which is embodied complementary to the socket with the negative pole contour.

According to the invention, it is provided that the respective battery module has a module housing, which electrically insulates the negative pole contact element and the positive pole contact element to the outside in the basic position of the respective module connector. For this purpose, the module housing can consist, for example, of an electrically insulating plastic. In the basic position, the module connector is then arranged completely in the module housing, so that no direct contact with the negative pole contact element and/or with the positive pole contact element is possible. The battery module can then be transported, assembled and disassembled safely. In addition, a cover can also be provided, which closes the negative pole contact element and/or the positive pole contact element to the outside in the basic position. In the switching position, the cover is then open in order to be able to electrically interconnect the respective negative pole contact element to the corresponding positive pole contact element.

To be able to electrically interconnect the individual battery modules to one another after the assembly, it can advantageously be provided that the positive pole contact element and/or the negative pole contact element are in each case secured to the module connector by means of a flexible electrical conductor. The flexible electrical conductor can be, for example, a fiber ribbon conductor or a cable conductor or an elastically deformable conductor. In the alternative, the flexible electrical conductor can also be a metal layer conductor of aluminum or of copper. Due to the flexible electrical conductor, the positive pole contact element and/or the negative pole contact element can be moved relative to the module connector and to the battery module and can be electrically interconnected to one another. The positive pole contact element can thus for example be designed in the shape of a plug and can be secured to the module connector by means of the flexible electrical conductor. After the assembly of the battery modules, the positive pole contact element can then be electrically contact-connected to the immovable negative pole contact element of the adjacent battery module, and the adjacent battery modules can be interconnected to one another in this way.

According to the invention, it is provided that the respective module connector has a guide device. The positive pole contact element and/or the negative pole contact element can be displaced relative to the battery module by means of the guide device and the respective module connector can thus be adjusted from the basic position into the switching position and back. For the intended purpose, the guide device is advantageously operatively connected to the positive pole contact element and/or to the negative pole contact element, in order to be able to displace the positive pole contact element and/or the negative pole contact element without a direct contact to them relative to the battery module. For this purpose, the positive pole contact element and/or to the negative pole contact element can be secured to the guide device in a non-positive manner, by means of a substance-to-substance bond or in a positive manner.

According to the invention, the respective guide device has an integrally molded actuating element, by means of which the guide device can be actuated and the positive pole contact element and/or the negative pole contact element can be displaced relative to the battery module. The actuating element can be, for example, a linearly displaceable actuating slide, which can be linearly guided in an elongate guide opening of the module housing. The actuating slide thereby cooperates with the negative pole contact element and/or with the positive pole contact element, so that, when actuating the actuating slide in the guide opening, they are displaced relative to the battery module. Advantageously, the positive pole contact element and the negative pole contact element are arranged on the module connector and on the battery module in such a way that, in response to the displacement of the actuating slide, the positive pole contact elements can be electrically interconnected to the negative pole contact elements of the adjacent battery modules, and the respective actuated module connectors can be displaced from the basic position into the switching position.

It can advantageously also be provided that the respective guide device consists of an electrically insulating material and the actuating element is thus electrically insulated from the respective positive pole contact element and/or from the respective negative pole contact element. In response to the actuation of the guide device, no currents can be discharged from the battery module in this way and the battery modules can be safely interconnected to one another.

In the case of a further development of the rechargeable battery arrangement according to the invention, it is advantageously provided that the rechargeable battery arrangement has a module support, to which the respective battery modules are releasably secured in a non-positive or positive manner. In the module support, the battery modules can, for example, be arranged next to one another in rows and can subsequently be electrically interconnected to one another. The module support can thereby be secured to a base plate of the electric or hybrid vehicle with or without the already secured battery modules. The rechargeable battery arrangement can be secured in the electric or hybrid vehicle in a simplified manner in this way.

The module support can advantageously have at least one interconnecting device, which cooperates with at least one of the guide devices and actuates the latter. The interconnecting device can cooperate, for example, with the guide devices of all battery modules of the rechargeable battery arrangement and can also actuate them simultaneously. In the alternative, the individual interconnecting devices can cooperate with the individual guide devices of the battery modules—for example in rows or individually—and the battery modules can also be electrically interconnected to one another accordingly—for example in rows or individually. The at least one interconnecting device can cooperate, for example by means of a positive connection, with at least one of the guide devices—preferably with the actuating element of the guide device. For this purpose, the interconnecting device can have at least one interconnecting element, which is embodied complementary to the respective actuating element and which forms a positive connection with the actuating element of the respective guide device. The module connectors of the respective battery modules can in particular be adjusted from the basic position into the switching position with a few movements by means of the at least one interconnecting device, and the battery modules can be electrically interconnected to one another in the rechargeable battery arrangement with reduced effort and in a safe manner.

To be able to actuate the interconnecting device so as to save energy, the interconnecting device can have an electrical or a pneumatic or a mechanical actuator. The at least one interconnecting device and thus also the at least one of the guide devices can then be actuated by means of the actuator. In particular in the case of a plurality of guide devices, which can be actuated by means of the common interconnecting device, the interconnecting device can be actuated with reduced effort and so as to sage energy by means of the actuator.

To be able to electrically insulate the battery modules to the outside, the rechargeable battery arrangement can have a battery housing, which is secured to the module support. It can advantageously be provided thereby that the at least one interconnecting device is arranged and can be actuated outside of the battery housing at least in some areas. The battery modules, which are arranged in the battery housing and which are not interconnected, can be electrically interconnected to one another from the outside by means of the interconnecting device. In response to and after the interconnecting, the battery modules are thereby enclosed and are electrically insulated to the outside by the battery housing. The rechargeable battery arrangement can thus be safely assembled and disassembled.

It can further be provided that the rechargeable battery arrangement has an electrical or a mechanical locking device. In the switching position of the respective module connectors, the battery housing can thereby be locked to the module support and the battery housing can be unlocked from the module support in the basic position of the respective module connectors. If the battery modules are electrically interconnected to one another in the rechargeable battery arrangement, the battery housing can consequently not be disassembled, and the battery modules remain electrically insulated to the outside. The rechargeable battery arrangement can also be assembled and disassembled by untrained personnel in a particularly safe manner in this way.

As a whole, the battery modules can be electrically interconnected to one another with reduced effort in the rechargeable battery arrangement according to the invention. The rechargeable battery arrangement can further also be assembled and disassembled by untrained personnel in a particularly safe manner.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
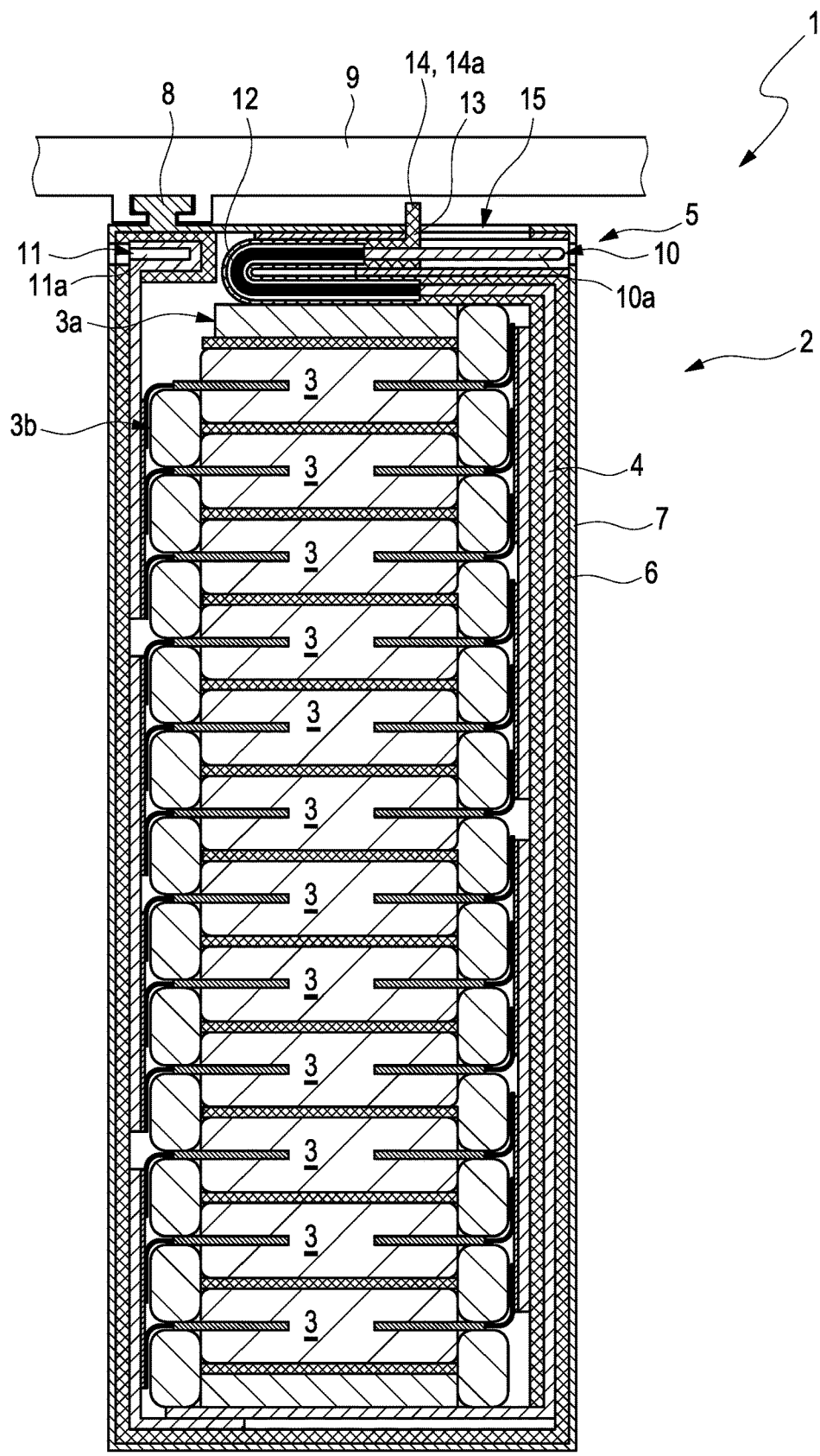
FIG. 1 shows a section of a rechargeable battery arrangement according to the invention comprising a battery module in section, which has a guide device.

FIG. 1 shows a section of a rechargeable battery arrangement 1 according to the invention for an electric or hybrid vehicle comprising a battery module 2. The battery module 2 has a plurality of individual cells 3—in this exemplary embodiment pouch cells—which are electrically interconnected to one another. The individual cells 3 are thereby clamped to one another to form a block by means of a clamping arrangement 3a and are cooled by means of a cooling device 3b. A module connector 4 of a module connector arrangement 5 is secured by means of a substance-to-substance bond to the battery module 2, wherein the individual cells 3 of the battery module 2, which are clamped to one another, are electrically contact-connected to the outside by means of the module connector 4. The module connector 4 is electrically insulted to the outside in some areas by means of an insulating casing 6 of an electrically insulating material. The battery module 2 further has a module housing 7, by means of which a positive locking unit 8 is secured to a module support 9 in a positive manner. Advantageously, the module housing 7 also consists of an electrically insulating material—such as plastic, for example—and electrically insulates the module connector 4 to the outside. The module support 9 can be secured, for example, to a base plate of the electric or hybrid vehicle, and the rechargeable battery arrangement 1 can be secured in the electric or hybrid vehicle in this way.

The module connector 4 further has a positive pole contact element 10 and a negative pole contact element 11. In this exemplary embodiment, the positive pole contact element 10 is embodied in the form of a plug 10a with a positive pole contour, and the negative pole contact element 11 is embodied in the form of a socket 11a with a complementary negative pole contour. The negative pole contact element 11 is secured to the battery module 2, and the positive pole contact element 10, in contrast, can be displaced relative to the battery module 2. For this purpose, the positive pole contact element 10 is secured to the module connector 4 by means of a flexible electrical conductor 12. In the basic position of the module connector 4—as shown here—the positive pole contact element 10 and the negative pole contact element 11 are arranged completely and thus in a contact-protected manner in the module housing 7. The battery module 2 can thus be transported safely and can be assembled and disassembled on the module support 9.

To displace the positive pole contact element 10, the battery module 2 has a guide device 13 comprising an actuating element 14—here a linear actuating slide 14a. The guide device 13 advantageously consists of an electrically insulating material and is secured by means of a substance-to-substance bond to the positive pole contact element 10.

The actuating slide 14a cooperates with the positive pole contact element 10, so that the plug 10a of the positive pole contact element 10, together with actuating slide 14a, can be displaced in a guide opening 15 of the module housing 7. In the basic position of the module connector 4—as shown here—the positive pole contact element 10 is located in in the module housing 7 and is electrically insulated to the outside by means of the module housing 7. The actuating slide 14a protrudes out of the module housing 7 through the guide opening 15, whereby the positive pole contact element 10 cannot discharge any currents to the outside, even in the case of a direct contact with the electrically insulating actuating slide 14a. The module connector 4 can be adjusted from the basic position—as shown here—into a switching position by a displacement of the actuating element 14a in the guide opening 15. The positive pole contact element 10 thereby moves out of the module housing 7 to the outside and can be electrically interconnected to a negative pole contact element 11 of an adjacent battery module 2—not shown here.

Figure 2:
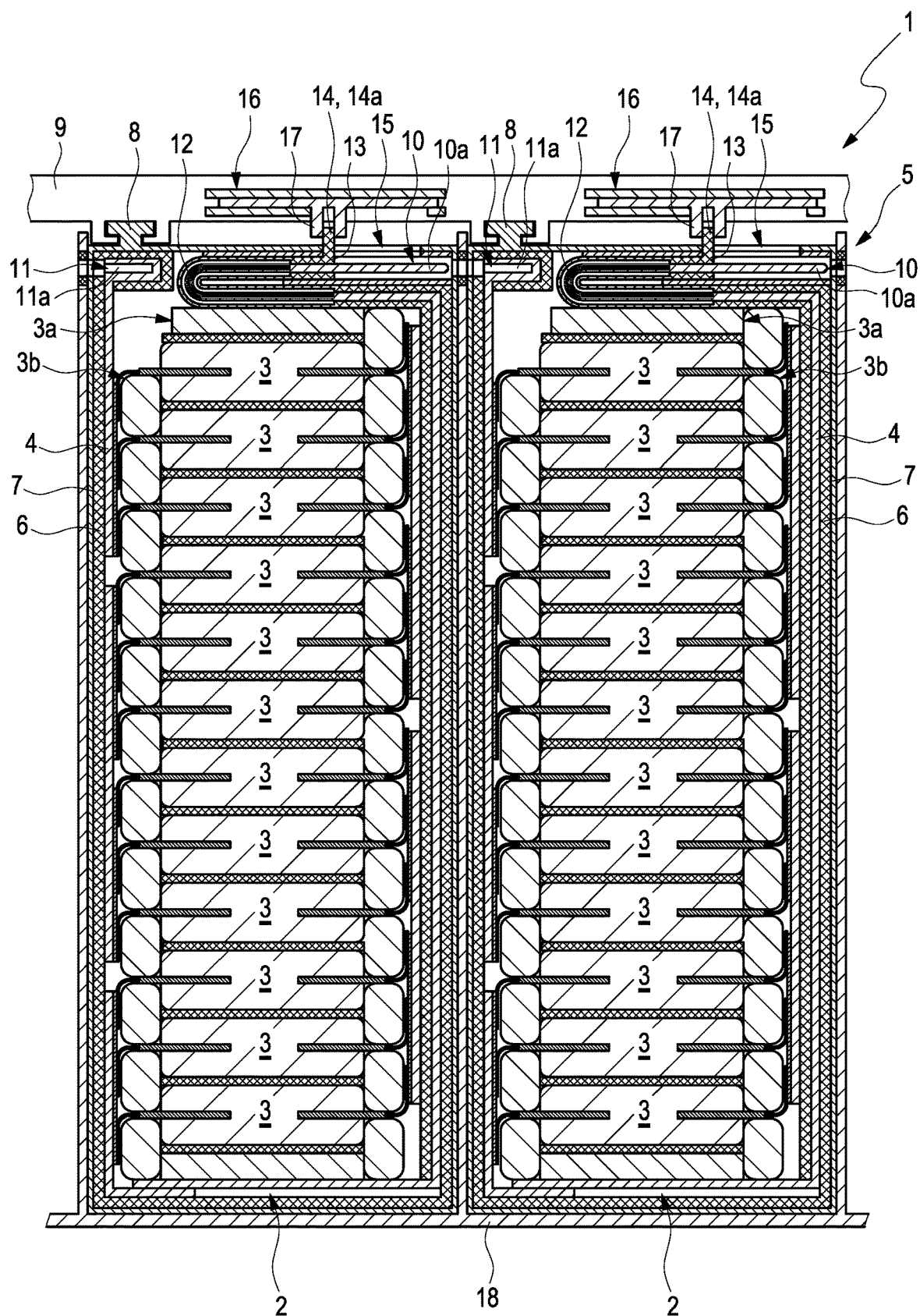
FIG. 2 shows a section of a rechargeable battery arrangement according to the invention comprising battery modules, which are not interconnected, in section, wherein a respective interconnecting device in each case cooperates with a guide device.
Figure 3:
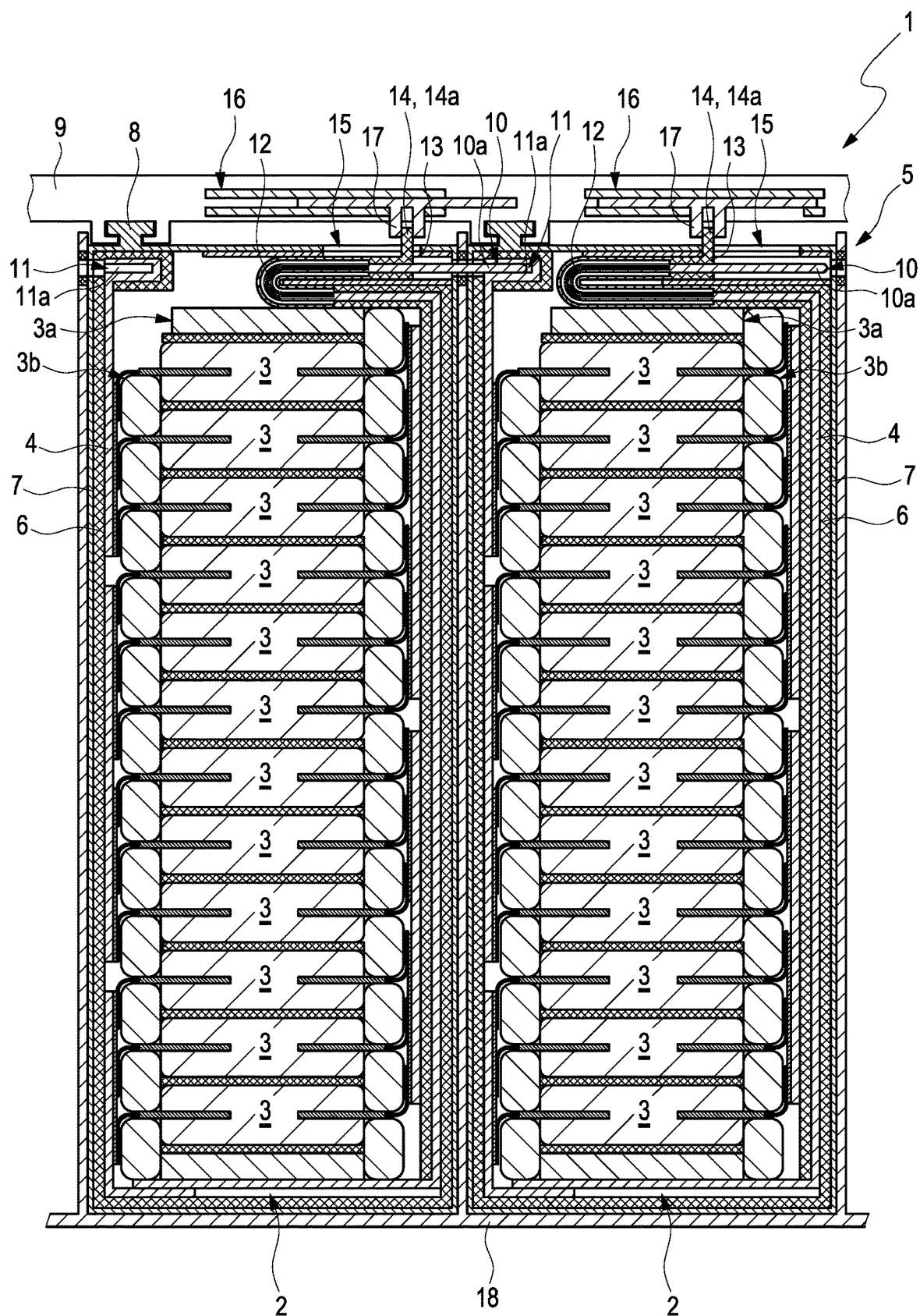
FIG. 3 shows a view of the rechargeable battery arrangement shown in FIG. 2 comprising interconnected battery modules in section.

FIG. 2 and FIG. 3 show sections of the alternatively designed rechargeable battery arrangement 1, wherein the battery modules 2 are secured adjacent to the module support 9. In FIG. 2, the module connectors 4 of the respective battery modules 2 are shown in the basic position, and one of the module connectors 4 is adjusted into the switching position in FIG. 3. In contrast to the rechargeable battery arrangement 1 in FIG. 1, the module support 9 in this exemplary embodiment has two interconnecting devices 16, which each cooperate with one of the guide devices 13 and actuate the latter. For this purpose, the respective actuating slide 14a forms a positive connection with a complementarily embodied interconnecting element 17 of the respective interconnecting device 16, so that the respective guide device 13 can also be actuated in response to actuating the interconnecting device 16.

If one of the interconnecting devices 16 is now actuated, the corresponding interconnecting element 17 and the actuating slide 14a displace relative to the respective battery module 2. The positive pole contact element 10, which cooperates with the actuating slide 14a, displaces accordingly in the direction of the adjacent battery module 2 and is electrically contact-connected to the negative pole contact element 11 of the adjacent battery module 2. The plug 10a is accordingly secured in the socket 11a in a negative or positive manner and the adjacent battery modules 2 are electrically interconnected to one another. The respective module connector 4 is adjusted from the basic position into the switching position way. The module connector 4 can also be adjusted from the switching position into the basic position in the same way. In FIG. 2, the module connectors 4 of the respective battery modules 2 are in the basic position, and one of the module connectors 4 is adjusted from the basic position into the switching position in FIG. 3.

To electrically insulate the battery modules 2 to the outside, the rechargeable battery arrangement 1 also has a battery housing 18 in this exemplary embodiment. The battery housing 18 is secured to the module support 9 and encloses the battery modules 2. The interconnecting devices 16 are thereby arranged outside of the battery housing 18 in some areas and can be actuated. In response to the assembly, the battery modules 2 are first secured to the module support 9 by means of the positive locking units 8. The module supports 4 of the respective battery modules 2 are thereby in the basic position, so that the positive pole contact element 10 and the negative pole contact element 11 of the respective battery module 2 are electrically insulated to the outside by means of the insulating casing 6 and the module housing 7. The battery housing 18 can subsequently be secured to the module support 9, and the battery modules 2, which are not interconnected, are electrically insulted completely to the outside. The interconnecting devices 16 can subsequently be actuated from the outside, and the battery modules 2 secured in the battery housing 18 can be electrically interconnected to one another. The rechargeable battery arrangement 1 can further also have an electrical or a mechanical locking device, which locks the battery housing 18 to the module support 9 in the switching position of the respective module connectors 4, and unlocks it in the basic position of the respective module connectors 4. The battery modules 2 can thus be assembled and interconnected to one another in a safe manner in the rechargeable battery arrangement 1.

Figure 4:
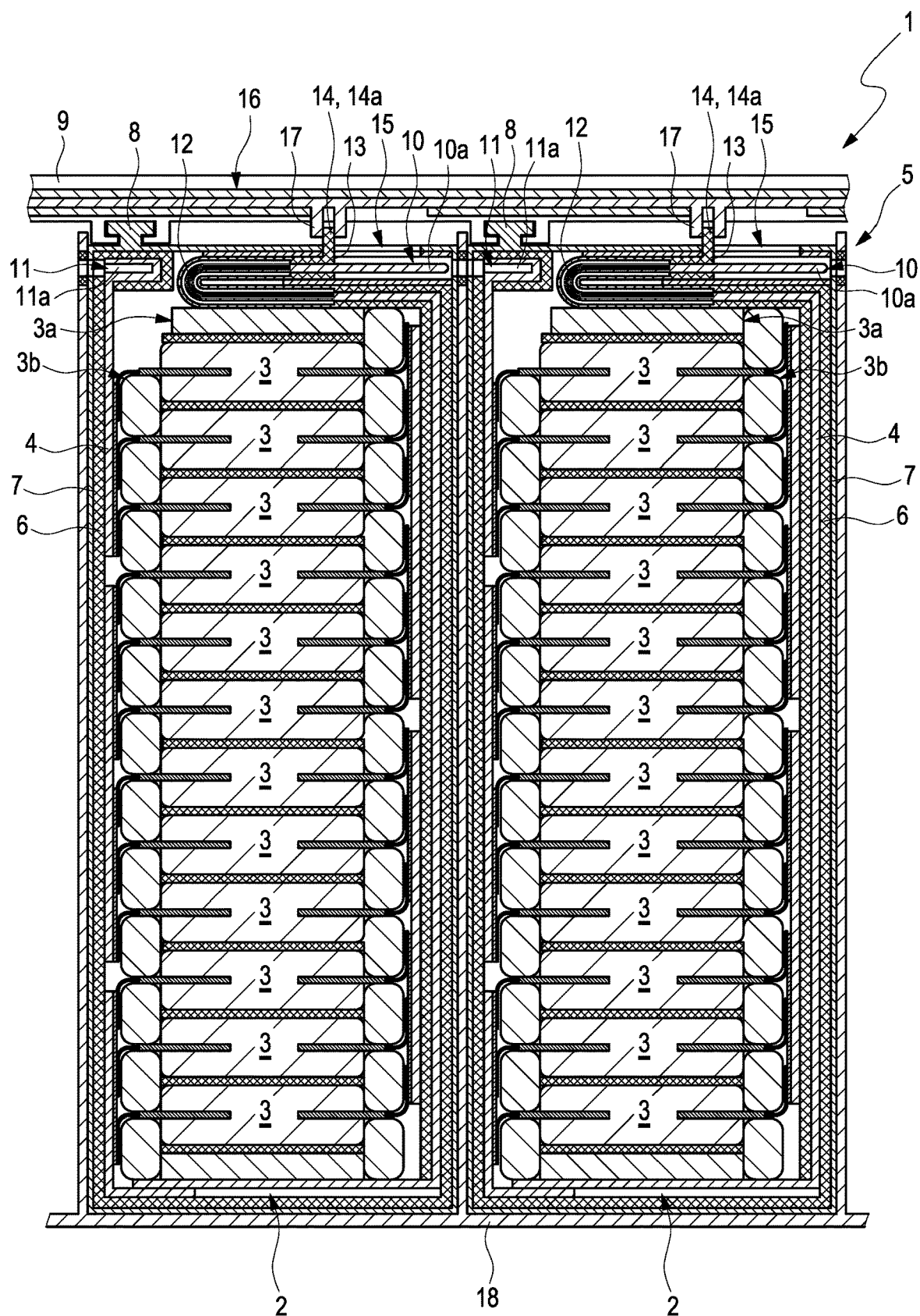
FIG. 4 shows a section of a rechargeable battery arrangement according to the invention comprising battery modules, which are not interconnected, in section, wherein an interconnecting device cooperates with a plurality of guide devices.
Figure 5:
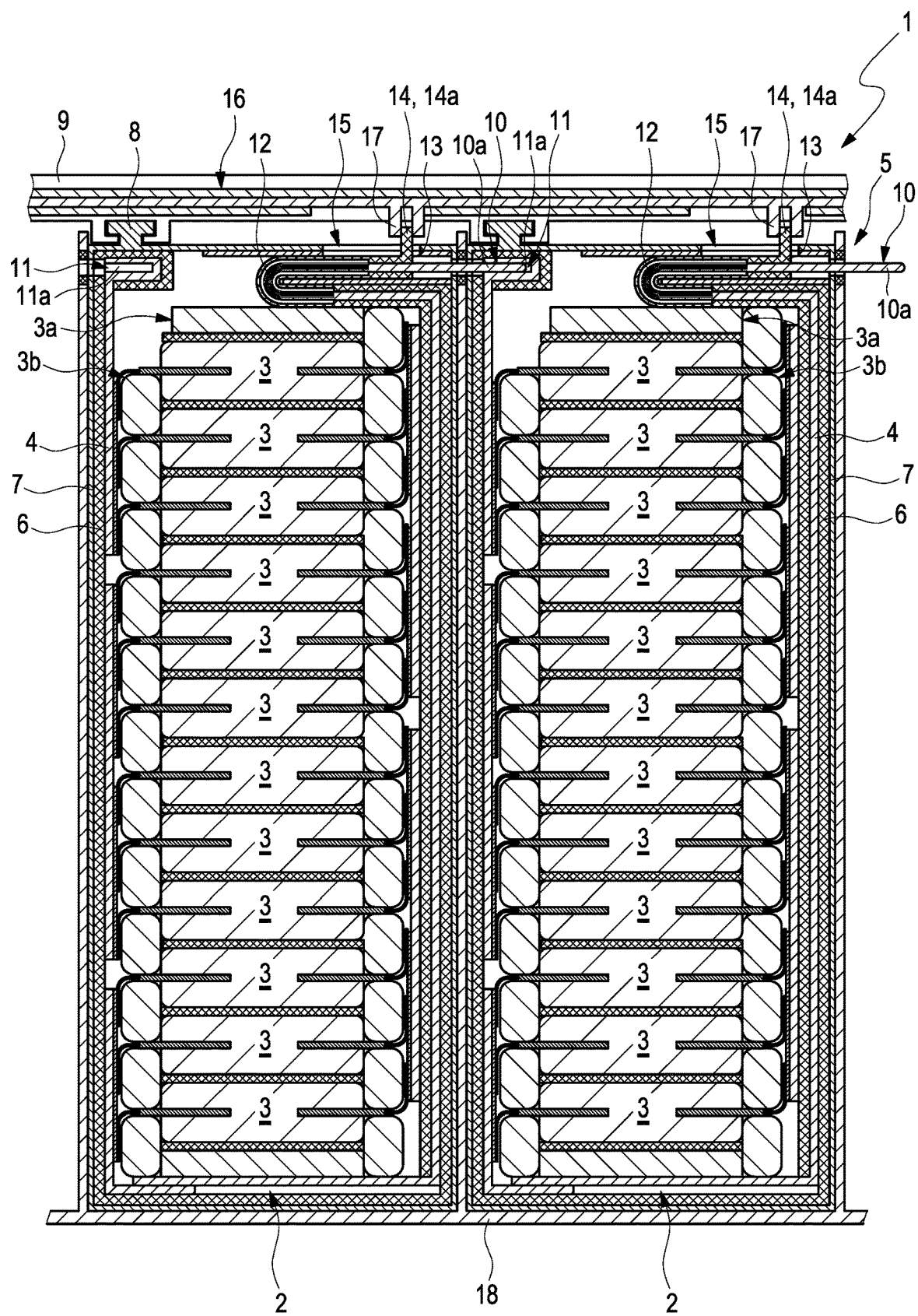
FIG. 5 shows a plan view of the rechargeable battery arrangement shown in FIG. 4 comprising battery modules, which are interconnected to one another, in section.

FIG. 4 and FIG. 5 show sections of the alternatively designed rechargeable battery arrangement 1 comprising the two battery modules 2, which are secured adjacently to the module support 9. In FIG. 4, the module connectors 4 of the battery modules 2 are in the basic position and in FIG. 5 in the switching position. In contrast to the rechargeable battery arrangement 1 in FIG. 2 and FIG. 3, the guide devices 13 of the respective battery modules 2 can be actuated by means of the common interconnecting device 16. The battery modules 2 can in particular be interconnected to one another so as to save time and energy in this way. Advantageously, the rechargeable battery arrangement 1 can also have a linear actuator, by means of which the interconnecting device 16 can be actuated.

Conventionally used connector rails or cables or current bridges can advantageously be avoided in the rechargeable battery arrangement 1 according to the invention, and the battery modules 2 can be assembled, disassembled, and electrically interconnected to one another with reduced effort and in a safe manner. The module connectors 4 of the respective battery modules 2 can further be adjusted from the basic position into the switching position with a few movements by means of the interconnecting device 16, and the battery modules 2 can also be electrically interconnected to one another in the rechargeable battery arrangement 1 with reduced effort and in a safe manner.

The invention claimed is:

1. A rechargeable battery arrangement for an electric or hybrid vehicle, comprising:
   a plurality of battery modules electrically contact-connected to one another;
   each of the plurality of battery modules including a plurality of individual cells electrically interconnected to one another;
   a module connector arrangement electrically contact-connecting adjacent battery modules of the plurality of battery modules when in a switching position, and electrically separating the adjacent battery modules when in a basic position;
   the module connector arrangement including a plurality of module connectors, wherein each respective module connector of the plurality of module connectors is secured via a substance-to-substance bond to a respective battery module of the plurality of battery modules, includes a positive pole contact element and a negative pole contact element, and is electrically contact-connected to the plurality of individual cells of the respective battery module;
   the basic position of the module connector arrangement corresponding to a basic position of each of the plurality of module connectors, and the switching position of the module connector arrangement corresponding to a switching position of each of the plurality of module connectors;

the positive pole contact element of one of the adjacent battery modules and the negative pole contact element of the other of the adjacent battery modules abutting one another and electrically contact-connected to one another when the respective module connector of each of the adjacent battery modules is in the switching position;

each respective module connector including a guide device configured to displace at least one of the positive pole contact element and the negative pole contact element relative to the respective battery module such that the respective module connector is adjustable between the basic position and the switching position;

each of the plurality of battery modules including a module housing, the positive pole contact element and the negative pole contact element of the respective module connector arranged in the module housing of the respective battery module and electrically insulated to an outside when the respective module connector is in the basic position;

the guide device of each respective module connector including an integrally molded actuating element via which the guide device is actuatable and the at least one of the positive pole contact element and the negative pole contact element of the respective module connector is displaceable relative to the respective battery module; and wherein, in response to an actuation of the actuating element, the at least one of the positive pole contact element and the negative pole contact element of the respective module connector is displaced out of the module housing of the respective battery module to the outside and is electrically interconnectable to at least one of the positive pole contact element and the negative pole contact element of an adjacent battery module of the plurality of battery modules.

2. The rechargeable battery arrangement according to claim 1, wherein the positive pole contact element has a positive pole contour and the negative pole contact element has a negative pole contour, and wherein the positive pole contour and the negative pole contour are structured in a complementary manner and are securable to one another in at least one of a positive manner and a negative manner.

3. The rechargeable battery arrangement according to claim 2, wherein the positive pole contact element is structured as a plug with the positive pole contour, and wherein the negative pole contact element is structured as a socket, configured complementary to the plug, with the negative pole contour.

4. The rechargeable battery arrangement according to claim 1, wherein at least one of the positive pole contact element and the negative pole contact element is secured to the respective module connector via a flexible electrical conductor.

5. The rechargeable battery arrangement according to claim 4, wherein the flexible electrical conductor is structured as a metal layer conductor of aluminum.

6. The rechargeable battery arrangement according to claim 4, wherein the flexible electrical conductor is structured as a metal layer conductor of copper.

7. The rechargeable battery arrangement according to claim 4, wherein the flexible electrical conductor is structured as at least one of (i) a fiber ribbon conductor, (ii) a cable conductor, (iii) a metal layer conductor, and (iv) an elastically deformable conductor.

8. The rechargeable battery arrangement according to claim 7, wherein the actuating element is configured as a linearly displaceable actuating slide.

9. The rechargeable battery arrangement according to claim 1, wherein the guide device is composed of an electrically insulating material and electrically insulates the actuating element from at least one of the positive pole contact element and the negative pole contact element of the respective module connector.

10. The rechargeable battery arrangement according to claim 1, further comprising a module support to which the plurality of battery modules are releasably securable in at least one of a non-positive manner and a positive manner.

11. The rechargeable battery arrangement according to claim 10, further comprising a battery housing secured to the module support and electrically insulating the plurality of battery modules to the outside.

12. The rechargeable battery arrangement according to claim 11, further comprising at least one of an electrical locking device and a mechanical locking device, wherein:
when the plurality of module connectors are in the switching position, the battery housing is locked to the module support via the at least one of the electrical locking device and the mechanical locking device; and
the battery housing is unlocked from the module support via the at least one of the electrical locking device and the mechanical locking device when the plurality of module connectors are in the basic position.

13. The rechargeable battery arrangement according to claim 10, wherein the module support includes at least one interconnecting device structured and arranged to cooperate with and actuate the guide device of at least one of the plurality of module connectors.

14. The rechargeable battery arrangement according to claim 13, wherein the at least one interconnecting device cooperates via a positive connection with the guide device of at least one of the plurality of module connectors.

15. The rechargeable battery arrangement according to claim 13, wherein the at least one interconnecting device includes at least one of an electrical actuator, a pneumatic actuator, and a mechanical actuator, configured to actuate the at least one interconnecting device.

16. The rechargeable battery arrangement according to claim 13, further comprising a battery housing secured to the module support and electrically insulating the plurality of battery modules to the outside, wherein the at least one interconnecting device is arranged and is actuatable outside of the battery housing at least in some areas.

17. The rechargeable battery arrangement according to claim 13, wherein the at least one interconnecting device cooperates via a positive connection with the actuating element of at least one of the plurality of module connectors.

18. A rechargeable battery arrangement for an electric or hybrid vehicle, comprising:
a plurality of battery modules electrically contact-connected to one another;
each of the plurality of battery modules including a plurality of individual cells electrically interconnected to one another;
a module connector arrangement electrically contact-connecting adjacent battery modules of the plurality of battery modules when in a switching position, and electrically separating the adjacent battery modules when in a basic position;

the module connector arrangement including a plurality of module connectors, wherein each respective module connector of the plurality of module connectors is secured via a substance-to-substance bond to a respective battery module of the plurality of battery modules, includes a positive pole contact element and a negative pole contact element, and is electrically contact-connected to the plurality of individual cells of the respective battery module;

the basic position of the module connector arrangement corresponding to a basic position of each of the plurality of module connectors, and the switching position of the module connector arrangement corresponding to a switching position of each of the plurality of module connectors;

the positive pole contact element of one of the adjacent battery modules and the negative pole contact element of the other of the adjacent battery modules abutting one another and electrically contact-connected to one another when the respective module connector of each of the adjacent battery modules is in the switching position;

each respective module connector including a guide device configured to displace at least one of the positive pole contact element and the negative pole contact element relative to the respective battery module such that the respective module connector is adjustable between the basic position and the switching position;

each of the plurality of battery modules including a module housing, the positive pole contact element and the negative pole contact element of the respective module connector arranged in the module housing of the respective battery module and electrically insulated to an outside when the respective module connector is in the basic position;

the guide device of each respective module connector including an integrally molded linearly displaceable actuating slide via which the guide device is actuatable and the at least one of the positive pole contact element and the negative pole contact element of the respective module connector is displaceable relative to the respective battery module; and wherein, in response to an actuation of the actuating element, the at least one of the positive pole contact element and the negative pole contact element of the respective module connector is displaced out of the module housing of the respective battery module to the outside and is electrically interconnectable to at least one of the positive pole contact element and the negative pole contact element of an adjacent battery module of the plurality of battery modules.

19. A rechargeable battery arrangement for an electric or hybrid vehicle, comprising:

a plurality of battery modules electrically contact-connected to one another;

each of the plurality of battery modules including a plurality of individual cells electrically interconnected to one another;

a module support to which the plurality of battery modules are releasably secured;

a battery housing secured to the module support and electrically insulating the plurality of battery modules to an outside;

a module connector arrangement electrically contact-connecting adjacent battery modules of the plurality of battery modules when in a switching position, and electrically separating the adjacent battery modules when in a basic position;

the module connector arrangement including a plurality of module connectors, wherein each respective module connector of the plurality of module connectors is secured via a substance-to-substance bond to a respective battery module of the plurality of battery modules, includes a positive pole contact element and a negative pole contact element, and is electrically contact-connected to the plurality of individual cells of the respective battery module;

the basic position of the module connector arrangement corresponding to a basic position of each of the plurality of module connectors, and the switching position of the module connector arrangement corresponding to a switching position of each of the plurality of module connectors;

the positive pole contact element of one of the adjacent battery modules and the negative pole contact element of the other of the adjacent battery modules abutting one another and electrically contact-connected to one another when the respective module connector of each of the adjacent battery modules is in the switching position;

each respective module connector including a guide device configured to displace at least one of the positive pole contact element and the negative pole contact element relative to the respective battery module such that the respective module connector is adjustable between the basic position and the switching position;

each of the plurality of battery modules including a module housing, the positive pole contact element and the negative pole contact element of the respective module connector arranged in the module housing of the respective battery module and electrically insulated to the outside when the respective module connector is in the basic position;

the guide device of each respective module connector including an integrally molded actuating element via which the guide device is actuatable and the at least one of the positive pole contact element and the negative pole contact element of the respective module connector is displaceable relative to the respective battery module; and wherein, in response to an actuation of the actuating element, the at least one of the positive pole contact element and the negative pole contact element of the respective module connector is displaced out of the module housing of the respective battery module to the outside and is electrically interconnectable to at least one of the positive pole contact element and the negative pole contact element of an adjacent battery module of the plurality of battery modules.

20. The rechargeable battery arrangement according to claim 19, wherein the positive pole contact element is structured as a plug, and wherein the negative pole contact element is structured as a socket configured complementary to the plug.

* * * * *